United States Patent [19] [11] 4,412,032
Gaske et al. [45] Oct. 25, 1983

[54] SILICONIZED POLYETHER THERMOSETTING COATING COMPOSITIONS

[75] Inventors: Joseph E. Gaske, Mt. Prospect; Thomas H. Plaisance, Wilmette; Kazys Sekmakas, Palatine, all of Ill.

[73] Assignee: DeSoto, Inc., Des Plaines, Ill.

[21] Appl. No.: 372,244

[22] Filed: Apr. 28, 1982

Related U.S. Application Data

[63] Continuation-in-part of Ser. No. 268,633, May 29, 1981, Pat. No. 4,370,441.

[51] Int. Cl.$^3$ ............................................. C08L 67/02
[52] U.S. Cl. .................................... 524/538; 524/265; 524/431; 524/539; 525/443; 525/446
[58] Field of Search ................ 525/443, 446; 528/29, 528/25; 524/265, 538, 539

[56] References Cited

U.S. PATENT DOCUMENTS 3,556,754  1/1971  Marsden et al. ................ 525/446
3,629,308  12/1971  Bailey et al. ......................... 528/29

*Primary Examiner*—Wilbert J. Briggs, Sr.
*Attorney, Agent, or Firm*—Dressler, Goldsmith, Shore, Sutker & Milnamow, Ltd.

[57] ABSTRACT

Pigmented thermosetting organic solvent solution coating compositions are disclosed which cure to provide improved weather resistance. These coating compositions contain three resin components, as follows:

(1) an essentially nonfunctional organic solvent-soluble silicone resin reaction product of a low molecular weight hydroxy functional polyether with an hydroxy or alkoxy-functional organic polysiloxane, said polyether having an average molecular weight in the range of 300 to 4000 and an hydroxy functionality of at least about 3, said polysiloxane being present in an amount of from 8% to 20% of the weight of the three resin components, and said polyether and said polysiloxane being combined in approximately stoichiometric proportions;

(2) a reactive organic solvent-soluble essentially linear high molecular weight hydroxy functional polyester constituting the balance of the three resin components; and (3) from 3% to 15% of the three resin components of a heterocyclic aminoplast resin for curing the reactive polyester.

Components 1 and 2 are compatible in the solution and at least partially incompatible in a film as the solvent evaporates, so that component 1 can concentrate at the surface to enhance the weather resistance.

9 Claims, No Drawings

SILICONIZED POLYETHER THERMOSETTING COATING COMPOSITIONS

This application is a continuation-in-part of our prior application Ser. No. 268,633 filed May 29, 1981 now U.S. Pat. No. 4,370,441.

DESCRIPTION

1. Technical Field

This invention relates to weather resistant thermosetting solution coating compositions containing a polysiloxane component which enhances resistance to weathering, especially as indicated by accelerated testing in an unshielded dew-cycle weatherometer.

2. Background Art

Polysiloxane-containing thermosetting solution coating compositions are known in which the polysiloxane component is condensed with a reactive resin to provide a combination which retains its reactivity and which is combined with a curing agent, such as a melamine-formaldehyde condensate, so that the coating can be applied and thermally cured upon a metal substrate. In these known compositions, an excessive proportion of polysiloxane is needed to achieve the desired weather resistance.

It is also known to use a polysiloxane which is not reactive so that it stratifies and concentrates at the surface of the coating during the cure. However, these polysiloxanes volatilize and burn during the baking operation forming silica particles which deposit in the oven. This is undesirable and wasteful of the expensive polysiloxane component. Also, inadequate compatibility in solution causes these systems to have poor package stability.

In this invention, we minimize the problems encountered by the prior art by having the polysiloxane component in a nonvolatile combination which still permits controlled incompatibility to develop during cure to concentrate the polysiloxane at the surface and thereby improve the weather resistance which is obtainable using a given proportion of polysiloxane.

DISCLOSURE OF INVENTION

In accordance with this invention, an organic solvent solution coating composition adapted to deposit a thermosetting weather-resistant coating, using a reduced proportion of organic polysiloxane, comprises three essential resin components, as follows: (1) an essentially nonfunctional organic solvent-soluble silicone resin reaction product of a low molecular weight hydroxy functional polyether with an hydroxy or alkoxy-functional organic polysiloxane, the polysiloxane being present in an amount of from 8% to 20% of the weight of the three components, and the polyether and the polysiloxane being combined in approximately stoichiometric proportions (±5%) and reacted extensively to provide a substantially inert condensate; (2) a reactive organic solvent-soluble, essentially linear high molecular weight, hydroxy functional polyester constituting the balance of the three resin components; and (3) from 3% to 15%, based on the weight of the three components, of a heterocyclic aminoplast resin for curing the reactive polyester of component 2. Components 1 and 2 are compatible in the solution and at least partially incompatible in a film as the solvent evaporates so that components 2 and 3 can cure in a deposited film and adhere the coating to a metal substrate, and component 1 can concentrate at the surface to enhance the weather resistance when a deposited coating is baked.

The concentration of component 1 which contains the polysiloxane allows this expensive component to be more efficiently utilized, and the prereaction of the polysiloxane with the polyether reduces its volatility so that this component is not lost during the bake and siliceous deposits do not form in the ovens which are used. Also, components 1 and 2 are compatibly retained in the organic solvent solution, but compatibility is reduced as the solvent evaporates which enhances the desired stratification.

Referring more particularly to the low molecular weight hydroxy functional polyethers which are prereacted with the polysiloxane to produce component 1, these have an average molecular weight in the range of 300 to 4000, preferably from 350 to 1000, and an hydroxy functionality of at least about 3. It is preferred to have from 1 to 2 hydroxy groups for each 100 to 300 units of molecular weight. Polyethers triols, such as trimethylol propane, are particularly preferred, but glycerin is also useful. Pentaerythritol is also appropriate and these are etherified with propylene glycol to provide the desired molecular weight. The polyether formed by etherifying trimethylol propane with propylene glycol to an average molecular weight in the range of 400–440 is particularly preferred and will be used in the examples.

The preferred polysiloxanes are methyl and/or phenyl-substituted polysiloxanes having an average molecular weight in the range of about 400 to about 6000, preferably 500 to 3000. These desirably contain from 1 to 10, preferably from 2 to 6 reactive groups per molecule. The methoxy polysiloxanes can contain from about 3% to about 25% by weight of the methoxy group and are illustrated by a methyl and phenyl substituted polysiloxane having a molecular weight of about 800 (by number average) and a methoxy content of 15% by weight. The hydroxy polysiloxanes (silanols) can contain from about 1% to about 15% by weight of he hydroxy group and are illustrated by a methyl and phenyl substituted polysiloxane having a molecular weight of about 2000 and a hydroxy content of 2.6% by weight.

Commercially satisfactory polysiloxanes are shown in the examples.

Considering the essentially linear, high molecular weight reactive polyester of component 2, the desired linearity is obtained by using essentially only difunctional reactants (less than 10% by weight of reactants of higher functionality and less than 5% by weight of monofunctional reactants). The desired high molecular weight is obtained by having the hydroxy to carboxy ratio in the reactants which are polyesterified in the range of 1.03:1 to 1.30:1. The polyesterification is continued until the acid value of the polyester is less than 30. The hydroxy number of the polyester is from 80 to 140, preferably from 90 to 120.

The proportion of the siliconized polyether to the linear reactive polyester is regulated to provide the desired amount of polysiloxane in the final product which includes the heterocyclic aminoplast curing agent, component 3 herein. From 8% to 20% polysiloxane based on the total of all three resin components is particularly preferred.

Proportions as set forth above are important to this invention. The proportion of heterocyclic aminoplast resin, especially when melamine formaldehyde condensates which are preferred herein are used, is preferably from 10% to 12% of the weight of the three components. On this same basis, the polysiloxane containing hydroxy or methoxy functionality used to form component 1 preferably constitutes from 10% to 17%, and the reactive high molecular weight polyester of component 2 will constitute the balance of the three essential resin components. Other curing agents, like phenoplast and urea-based resins do not provide comparable weather resistance. Other heterocyclic amines, such as benzoguanamine, may be reacted with formaldehyde to form the heterocyclic aminoplast resins used in this invention.

The weight ratio of polyether to polysiloxane in component 1 may range from 1:3 to 3:1 and is not critical so long as the functionalities in these two materials are in balance and are consumed to provide a reaction product which is essentially nonfunctional.

The coating compositions of this invention are usually pigmented, and pigment choice is secondary and illustrated in the examples. The pigment to binder weight ratio is typically in the range of 1:1 to 1:6.

Any organic solvent which does not react with any of the three components of the binder may be used. For example, toluene, aromatic hydrocarbon mixtures and butanol can be used. The solvent selection is conventional and is also illustrated in the examples.

The contribution provided by this invention will be apparent from a summary consideration of data obtained by accelerated testing in an unshielded dew-cycle weatherometer. Typical panels tested in this manner using prior construction coatings indicate that the color change produced by 500 hours testing increases as the proportion of the polysiloxane resin component is reduced. The higher the color change, the greater the number assigned to describe that change. On this basis, a typical prior composition containing 15% silicone resin gave a value of 8 and the system tested had only a moderate resistance to chalking. Increasing the silicone content of the system 30% improved the color change to 6 and the chalk resistance became excellent. At 50% silicone content, the color change resistance was still better, being assigned to a value of 3, and the chalk resistance remained excellent. In this invention, excellent chalk resistance and better resistance to color change, as indicated by a value of 2, is obtained when only 10% of the expensive silicone component is present in the composition which is tested.

The essentially nonfunctional organic solvent-soluble reaction product of the described reactive polyether with an hydroxy or alkoxy-functional organic polysiloxane should contain so little reactive functionality that the subsequent cure of the applied coating composition will not cause significant combination with either the reactive polyether of high molecular weight or the aminoplast resin. This refusal to react causes stratification in the final coating.

The language "essentially nonfunctional" is thus intended to include small amounts of reactive groups in a proportion which is too small to prevent stratification on subsequent cure. In preferred practice, the equivalents of reactive functionality per 100 grams of resin solids should be less than 0.1.

This refusal of one of the three resin components to chemically combine with the other two can be seen by applying a drop of methyl ethyl ketone onto the cured film in a horizontal position. After the ketone evaporates, an oily spot is visible at the periphery of the area where the drop had been. This establishes that the nonfunctional reaction product is free to be concentrated by the drop of solvent. If the film were cured at the surface, the drop of solvent would leave no detectable blemish after it evaporated.

The polyether and the polysiloxane should be coreactive and their functionalities should be in substantial balance as previously noted. Also, the molecular weight of the reacted components prior to reaction should be limited to avoid gelation, and the reaction should not be advanced to the point of gelation. This is broadly specified herein by requiring the essentially nonfunctional reaction product to be organic solvent-soluble.

The heterocyclic aminoplast resins are typified by hexamethoxymethyl melamine, though the ethyl, propyl and butyl ethers of hexamethylol melamine are also useful. Benzoguanamine may replace the melamine.

In our prior application Ser. No. 268,633 filed May 29, 1981, we have disclosed essentially the same combination invention except for the use of a siliconized polyester instead of the siliconized polyethers employed herein. Both types of compositions are illustrated in the following examples so that they can be compared with the prior art and with one another.

EXAMPLE 1

(Preparation of Reactive High Molecular Weight Polyester)

1040 grams of phthalic anhydride, 280 grams of isophthalic acid and 250 grams of adipic acid were esterified at 210° C. with the following polyols:
neopentyl glycol—822 grams
1,6-hexanediol—310 grams
trimethylol propane—45 grams The polyesterification was continued to an acid value of 15.2. During the reaction 236 grams of water distilled off. 1160 grams of aromatic solvent (Ashland Hi-Sol 4-1) and 130 grams of butanol were added. The polyester so-produced has an hydroxy number of 90 and the solution has the following characteristics:
Solids content—66.7%
Viscosity (Gardner-Holdt)—$Z_1$
Acid Value—15.2
Color (Gardner)—2–3

EXAMPLE 2A (Preparation of Nonfunctional Reaction Product)

810 grams of 2-ethoxy ethanol acetate, 950 grams of General Electric siloxane SR-191 (methyl and phenyl substituted polysiloxane containing 15% methoxy and a molecular weight of about 800) and 1.0 gram of tetraoctyl titanate catalyst are premixed and added to the polyester product previously produced. The mixture is heated to 150° C. and 80 grams of methanol are removed. The product is held for a Gardner-Holdt viscosity of U-W. 76 grams of butanol are then added and the product is cooled to 110° C.

The polyester component described previously was produced using 12.2 mols of hydroxy functionality and 7.0 mols of carboxy functionality which supplies an excess of 5.2 mols of hydroxy. The siloxane provides 4.8 mols of methoxy functionality, so the final product has very little residual functionality after the methoxy functionality has consumed most of the hydroxy functionality in the polyester.

EXAMPLE 3

71 parts by weight of the solution of Example 1 are blended with 17.8 parts of the solution of Example 2A and diluted with 11.2 parts of aromatic hydrocarbon solvent (Solvesso 150). This provides a final solution coating composition containing about 60% by weight of nonvolatile resin and having a silicone resin content of about 10% by weight.

EXAMPLE 4

A pigmented coating composition is prepared by mixing the following to a smooth paste and dispersing to a 7½ fineness (North Standard Gauge) in a sand mill:

| Parts | Component |
| --- | --- |
| 0.94 | 50% solution of Flexowax "C" (Glyco Chemicals, Inc.) in Solvesso 150 |
| 1.60 | Iron oxide pigment |
| 0.66 | Light chrome yellow pigment |
| 11.86 | Titanium dioxide, rutile pigment |
| 1.7 | Butanol |
| 1.41 | Solvesso 150 solvent |
| 7.16 | Solution product of Example 3 |

The following is dispersed by intensive mixing under a Cowles disperser to a fineness of 5½ (North Standard Gauge) and blended with the sand mill dispersed paste described above.

| Parts | Component |
| --- | --- |
| 4.71 | Amorphous Silica (Syloid 74 from W. R. Grace Co.) |
| 8.00 | Solvesso 150 |
| 16.71 | Solution product of Example 3 |

The following ingredients were added in the order shown, while mixing:

| Parts | Component |
| --- | --- |
| 39.55 | Solution product of Example 3 |
| 4.24 | Melamine Aminoplast resin (Monsanto product Resimene X-740) |
| 0.33 | 25% by weight, p-toluene sulfonic acid in butyl alcohol |
| | Shade in: |
| 1.13 | 20% by weight Bone Black Pigment (Hoover Color Corp. 3495), ground in Resimene X-740, 80% by weight. |
| 100.00% | total |

EXAMPLE 5

An oil free siliconized polyester solution containing 15% by chemical reaction in the conventional manner, was adjusted to 60% total nonvolatile resin by weight using Solvesso 150. This was used to prepare a pigmented coating composition in exactly the same manner used in Example 4.

EXAMPLE 6

A pigmented coating composition was prepared as in Example 4 using Aroplaz 1710-R-60. This is a 60% solids (by weight) polyester resin solution containing 50% silicone modification, based on the total nonvolatile resin.

EXAMPLE 7

A pigmented coating composition was prepared as in Example 4 using Aroplaz 1711-A9-60. This is a 60% solids (by weight) polyester resin solution containing 30% silicone modification based on the total nonvolatile resin.

EXAMPLE 8

The pigmented coating compositions of Examples 4, 5, 6 and 7 were separately applied onto 0.023 inch thick Parker 721 S treated aluminum panels using a #26 wire wound rod. Thermal conversion (or curing) to solid, solvent insoluble and thermally infusable films was done in a gas fired chamber oven for 30 seconds to a peak metal temperature of 450° F.

EXAMPLE 9

The panels of Example 8 were exposed in an Atlas XW-R unshielded Dew Cycle Weatherometer (Atlas Electric Devices, Chicago, Ill.) which was operated 60 minute arc light on and 60 minute light off, with cooling deionized water spray on backs of panels during light off cycle. The panels were periodically removed to measure color change and free chalk formation. The color changes were determined in conventional manner by comparing to unexposed control panels using a Hunter Color/difference meter D25-2 instrument (Hunter Associates Laboratory, Inc. Fairfax Va.) and are expressed in ΔE units as calculated using the Hunter lab ΔE computor; one ΔE (National Bureau of Standards) unit being that which is just barely discernible as a difference in color to the average human eye. The greater the color change, the larger the E value will be. Chalk values were determined using ASTM standard test designation D569-44 procedure employing a ⅞ inch Round Model Jackobsen Chalk Tester (Gardner Laboratories Inc.) Chalk values are expressed numerically from 10 to 1, with 10 being no chalk, and 1 being most chalky.

The results of this exposure after a total of 500 hours in the Weatherometer were:

| Example | Chalk Value | E |
| --- | --- | --- |
| 4- 10% Silicone Blend | 10 | 2 |
| 5- 15% Silicone Reacted | 6.5 | 8 |
| 6- 50% Silicone Reacted | 10 | 3 |
| 7- 30% Silicone Reacted | 10 | 6 |

This testing demonstrates the superior durability of the silicone blend provided by this invention in Examples 3 and 4.

EXAMPLE 10

(Preparation of Nonfunctional Reaction Product)

The equipment used is a 2 liter, 4-necked glass flask, a stirring assembly with stirrer and motor, a condenser with a trap to collect distillate, an inert gas line to blanket the contents of the flask with nitrogen, a thermometer and a temperature controller.

905 grams of a 50% solution in xylene of an hydroxy functional polysiloxane (see note 1) was heated with a propylene oxide adduct of trimethylol propane having an average molecular weight in the range of 400–440 (95 grams) [BASF/Wyandotte product TP440 can be used] in the presence of dibutyltin oxide catalyst (0.5 gram) [available from Aldrich Chemical Co.] until the xylene solvent begins to boil off which occurs at about 137° C. The progress of the reaction can be monitored in various ways as by the amount of xylene and water which is collected in the trap, by the viscosity of the solution, or conveniently by the speed of cure when a drop of the solution is placed on a hot plate maintained at 200° C. One simply measures the time it takes to gel the drop.

After 326 grams of distillate had been collected the cure time on the hot plate was reduced from 32 seconds to 23 seconds and the temperature of reaction had increased to 162° C. After 3 hours of heating the total distillate had increase to 348 grams at which point the gelation time on the hot plate was only 19 seconds. The batch was then cooled and 100 grams of xylene and 20 grams of 2-n-butoxy ethanol were added. 10% by weight of the total solvent present was then added in the form of an active alcohol (butanol in this example, but methanol or ethanol are also useful) to prevent further condensation. The final characteristics of the product are a viscosity of X-Y (Gardner Holdt); Solids content=71.47%; and gelation time=20 seconds. Note 1—A phenyl, methyl-substituted polysiloxane having an average molecular weight of about 2000 (by calculation) and providing, in the amount used, about 0.7 equivalents of OH functionality. The Dow Corning product DC805 may be used.

EXAMPLE 11

Examples 3 and 4 were repeated using the polyether-polysiloxane reaction product of Example 10 in place of the corresponding polyester product of Example 2A in the repeat of Example 3. Upon testing in the same way, the same high chalk resistance and resistance to color change were observed. In this way a composition containing about 10% silicone in a polyester or polyether reaction product outperforms conventional compositions containing up to 50% silicone resin.

What is claimed is:

1. An organic solvent solution coating composition adapted to deposit a thermosetting weather-resistant coating comprising three essential resin components, as follows:
   (1) an essentially nonfunctional organic solvent-soluble silicone resin reaction product of a low molecular weight hydroxy functional polyether with an hydroxy or alkoxy-functional organic polysiloxane, said polyether having an average molecular weight in the range of 300 to 4000 and an hydroxy functionality of at least about 3, said polysiloxane being present in an amount of from 8% to 20% of the weight of the three resin components, and said polyether and said polysiloxane being combined in approximately stoichiometric proportions;
   (2) a reactive organic solvent-soluble essentially linear high molecular weight hydroxy functional polyester, said hydroxy functionality being present in an amount to provide a thermoset film by reaction with aminoplast resin, said reactive polyester constituting the balance of the three resin components; and
   (3) from 3% to 15%, based on the weight of the three resin components, of a heterocyclic aminoplast resin for curing said reactive polyester, said components 1 and 2 being compatible in the solution and at least partially incompatible in a film as the solvent evaporates, so that components 2 and 3 can cure in a deposited film and adhere the coating to a metal substrate, and component 1 can concentrate at the surface to enhance the weather resistance which is obtained when a deposited coating is baked.

2. A coating composition as recited in claim 1 in which said low molecular weight polyether contains from 1 to 2 hydroxy groups for each 100 to 300 units of molecular weight.

3. A coating composition as recited in claim 2 in which said low molecular weight polyether has an average molecular weight of 350 to 1000.

4. A coating composition as recited in claim 2 in which said polysiloxane is hydroxy functional with an hydroxy content of from 1% to 15%.

5. A coating composition as recited in claim 1 in which said high molecular weight polyester is provided by polyesterification of essentially only difunctional reactants, the hydroxy to carboxy weight ratio range of the reactants being from 1.03:1 to 1.30:1, and the polyester has an acid value of less than 30.

6. A coating composition as recited in claim 5 in which said high molecular weight polyester has an hydroxyl number in the range of 80–140.

7. A coating composition as recited in claim 1 in which said aminoplast resin component is constituted by from 10% to 12%, based on the weight of the three resin components, of melamine-formaldehyde condensate.

8. A coating composition as recited in claim 1 in which said composition is pigmented to a pigment to binder weight ratio in the range of 1:1 to 1:6.

9. A coating composition as recited in claim 3 in which said polyether is the reaction product of propylene oxide with trimethylol propane.

* * * * *